Figure 1:
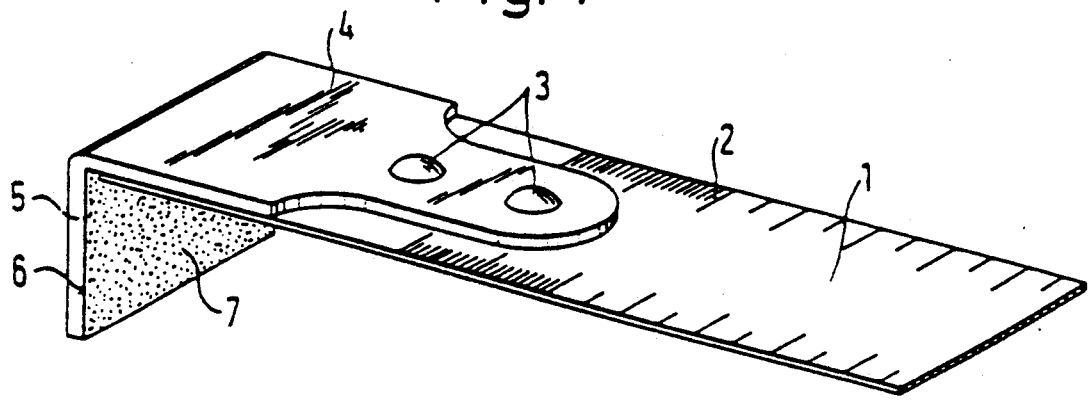

United States Patent
von Wedemeyer

Patent Number: 5,077,911
Date of Patent: Jan. 7, 1992

[54] ROLL TAPE MEASURE

[75] Inventor: Peter von Wedemeyer, Gernsbach, Fed. Rep. of Germany

[73] Assignee: Stabila Messgerate Gustav Ullrich GmbH & Co. KG, Fed. Rep. of Germany

[21] Appl. No.: 654,945

[22] Filed: Feb. 13, 1991

[30] Foreign Application Priority Data

Feb. 14, 1990 [DE] Fed. Rep. of Germany ... 9001732[U]

[51] Int. Cl.$^5$ .............................................. G01B 3/10
[52] U.S. Cl. ..................................................... 33/770
[58] Field of Search ................. 33/755, 768, 770, 771, 33/769, 759, 760, 766

[56] References Cited

U.S. PATENT DOCUMENTS 1,172,463  2/1916  Johnson ................................. 33/770
1,542,990  6/1925  Tomasso ............................... 33/770
2,893,656  7/1959  Carlson ............................. 33/761 X Primary Examiner—Harry N. Haroian
Attorney, Agent, or Firm—Ostrolenk, Faber, Gerb & Soffen

[57] ABSTRACT

The invention relates to a roll tape measure comprising an extractable measuring tape. Attached to the free end of the measuring tape (1) is a stop hook (4) which comprises a stop member (5) which projects approximately at right angles with respect to the measuring tape (1). That surface (6) of the stop member (5) which faces the measuring tape (1) is coated with friction bodies (7). These consist, for example, of sapphire crystals having a grain size of approximately 0,12 mm. This coating with friction bodies (7) provides the stop hook (4) with a good grip on the edge of the objects to be measured and with a high degree of resistance to wear.

18 Claims, 1 Drawing Sheet

ROLL TAPE MEASURE

The invention relates to a roll tape measure, such as a tape measure of the pocket, enclosed or framed type, or the like, the measuring tape of which is provided, at its free end, with a stop member which projects approximately at right angles relative to the measuring tape and which is intended for the abutting of the tape on the edge or the rim of an object to be measured, the abutting side which faces the object to be measured being roughened.

As a rule, such catches for roll tape measures are designed as angular hooks which are attached to the leading end of the tape by a fastening member which is parallel to the measuring tape so as to be displaceable in the longitudinal direction of the tape, and they comprise a hook-shaped stop member which projects at right angles therefrom. When measuring, the stop member can butt against the surface or edge of an object to be measured either with its outer side, which faces away from the measuring tape, or with its inner side, which faces the measuring tape.

If, for example, the inside width dimension of a window opening is to be measured, the outer side of the stop hook is placed against the wall of the window opening.

If, however, the width or the length of a table board is measured, the measuring tape is hooked on the edge of the table board by means of the stop hook and is pulled out across the board. In so doing, the catch frequently slides off from the table edge, even if the measuring tape is of a flexible but stable material such as steel, and the action of fastening the catch on the edge for measuring must frequently be repeated.

In order to prevent this, in the case of short lengths to be measured falling within arms, length range, the stop hook is held in one hand and, using the other hand, the measuring tape is unrolled. In the case of greater lengths to be measured, however, either a helper is required to assist or the stop hook must be fastened in position by means of some aid or device: a needle, adhesive tape, magnet or the like.

In order to obtain a better grip, stop hooks having a grooved stop face and which are intended to claw into the surface of the object to be measured, have become known. Experience has shown that these grooves are not sufficient to prevent the catch from sliding off.

A roll tape measure having a collapsible stop hook is known from DE-U-19 45 354. The latter comprises two pointed teeth having a length of several millimeters which are intended to claw into the object to be measured. This entails the danger of potential injuries. If the material of the object to be measured is hard, the teeth slide off, become blunt and/or are bent. If the material of the object to be measured is soft, the teeth penetrate to a greater or lesser extent, and the precise zero position of the measuring scale is lost.

The object of the invention is, therefore, to design the catch for the measuring tape in a roll tape measure such that it allows an exceptionally good grip on the measuring edge, that it is accurately adjusted to the zero position of the measuring scale of the measuring tape, both for inside measuring and for outside measuring, and that it prevents user injuries and damage to the object to be measured or to the receptacle of the tape measure, while providing good wear resistance and without requiring additional accessories.

According to the invention, this object is met in a roll tape measure of the kind described at the outset in that friction bodies in the form of fine crystals of mineral or synthetic substances are applied to the abutting side of the stop member, which friction bodies have hard and sharp edges and/or points, and in that the grain size is maximally 0,25 mm, preferably about 0,12 mm.

These friction bodies provide the catch with a high degree of frictional grip on the measuring edge, injuries and damage, however, being ruled out, even in the case of soft materials. The precise zero position of the measuring scale remains intact since the points of the friction bodies penetrate, if at all, only fractionally into the object to be measured.

The fine friction bodies consist of a material which has, according to the Mohs' hardness scale, at least a degree of hardness of 4, preferably a hardness degree of 6. They are suitably of a material such as silicate, quartz, feldspar, sapphire, corundum, diamond or other hard materials. This results in a high degree of resistance to wear, in particular a permanent resistance to wear.

The friction bodies can be applied in a thin, precisely defined thickness, preferably in a single layer. The friction bodies may be glued or sintered on to the stop member, or may be electro-embedded into the stop member. The friction bodies may be applied to the entire abutting side of the projecting catch or only to a partial region of said abutting side, preferably in the region of the free end of the abutting side. The friction bodies may at least partially be distributed in spaced relationship, or they may be arranged so as to be tightly packed in a closed layer.

Figure 2:
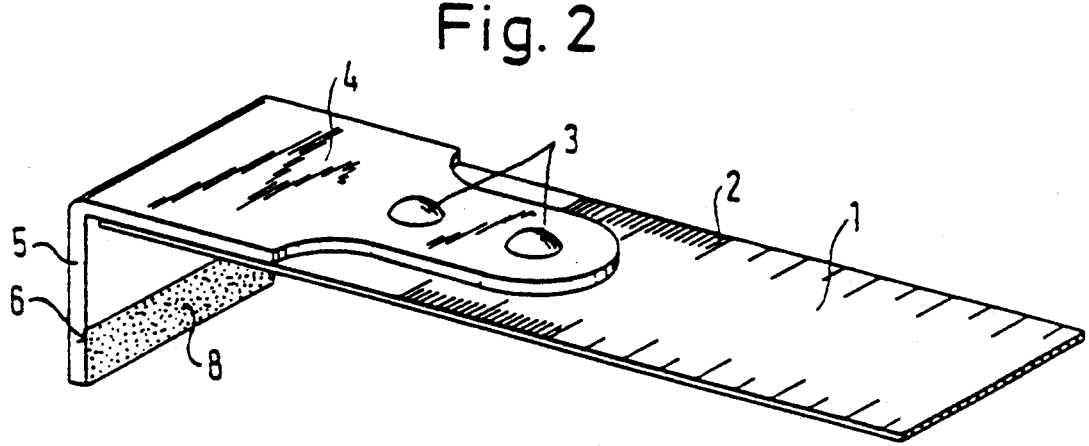
Figure 3:
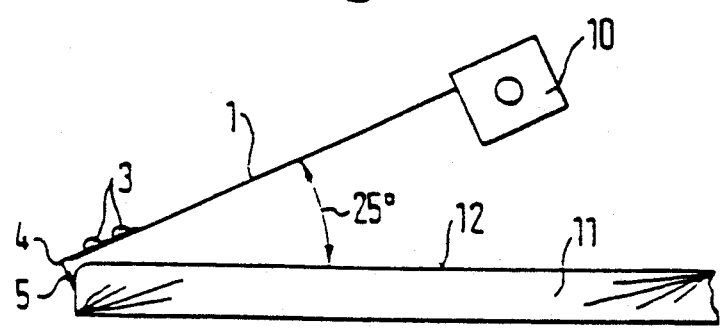

The invention will be described hereinafter with reference to the exemplified embodiments illustrated in the drawing, in which:

FIG. 1 shows a perspective view of the leading end of a roll tape measure having a stop hook according to a first embodiment, FIG. 2 shows a perspective view of the leading end of a roll tape measure having a stop hook according to a second embodiment, and FIG. 3 shows, in a side view, the abutment of a measuring tape having a stop hook on the rounded edge of a board to be measured.

FIGS. 1 and 2 show measuring tapes 1, e.g. of a pocket, enclosed or framed tape measure 10, which are provided with measuring graduations 2 on their upper sides. A stop hook 4 is attached to the leading end of the tape by means of rivets 3, which stop hook has a stop member 5 which projects at right angles from the measuring tape 1, and by means of the inner or outer side of which stop member the measuring tape 1 can be placed against an object 11 to be measured. If, for example, the measuring tape 1 is to be placed against the edge of a board 11, the stop hook 4 can be hooked on to the edge via its inner surface 6 (see FIG. 3). The measuring tape 1 is composed of a flexible but stable material, usually steel. Plastic materials or composite materials are also suitable.

In order to obtain a better grip by the stop hook 4 on the smooth and frequently rounded-off edge of an object 11 to be measured, the inner abutting side 6 of the stop member 5, which inner side faces the object 11 to be measured, is provided with a coating 7 of fine friction bodies which consist of mineral or synthetic substances and which are secured, with good adhesive strength, to the abutting side 6 by means of glueing, sintering or electro-embedding. In the embodiment according to FIG. 1, this coating 7 extends across the entire abutting side 6; in the embodiment according to FIG. 2, it extends only across a strip-shaped partial region 8 which is adjacent to the free end of the stop member 5.

A measuring tape 1, which, by means of the inner abutting side 6 of a stop hook 4, is placed against the edge of a board-like object 11 to be measured, is shown in FIG. 3. When extracting the measuring tape 1 from the housing 10 of the measuring tape, the measuring tape 1 is frequently not disposed directly in the measuring plane 12 of the object to be measured, but extends away from the measuring plane at an angle, as can be seen in FIG. 3. The angle between the measuring tape 1 and the measuring plane 12 causes the hook 4 to slip from the edge of the object 11 to be measured. Because of the coating of hard friction bodies, according to the invention, on the inner abutting side 6 of the stop hook 4, angles of up to 25 degrees between the measuring tape 1 and the measuring plane are possible without the hook 4 slipping from the edge of the object 11 to be measured. In addition, the coating is permanently wear-resistant.

I claim:

1. A roll tape measure, comprising a measuring tape, having at its free end a stop member which projects approximately at right angles with respect to the measuring tape and which is intended for the abutment of the tape on the edge or the rim of an object to be measured, the abutting side of the stop member which faces the object to be measured having friction bodies in the from of fine crystals of mineral or synthetic materials to roughen such abutting side, which friction bodies have hard and sharp edges and/or points, and the grain size of which is not greater than approximately 0.25 mm.

2. Roll tape measure according to claim 1, in which the friction bodies comprise a material which, according to the Mohs' hardness scale, has a degree of hardness of at least approximately 4.

3. Roll tape measure according to claim 1, in which the friction bodies comprise a material selected from the group consisting of glass, silicate, quartz, feldspar, sapphire, corundum and diamond.

4. Roll tape measure according to claim 1, in which the friction bodies are applied essentially in a single layer.

5. Roll tape measure according to claim 1, in which the friction bodies are glued on to the stop member.

6. Roll tape measure according to claim 1, in which the friction bodies are applied only to a partial region of the abutting side.

7. Roll tape measure according to claim 6, in which the friction bodies are applied in a strip-shaped region of the abutting side which is disposed at the free end of the stop member.

8. Roll tape measure according to claim 1, in which the friction bodies are, at least partially, arranged to be distributed in spaced relationship from each other.

9. Roll tape measure according to claim 1, in which the friction bodies are arranged to be tightly packed in a closed layer.

10. Roll tape measure according to claim 1, in which the abutting side of the stop member faces the measuring tape.

11. Roll tape measure according to claim 1, in which the grain size of the friction bodies is approximately 0.12 mm.

12. Roll tape measure according to claim 1, in which the friction bodies are sinted onto the stop member.

13. Roll tape measure according to claim 1, in which the friction bodies are electro-embedded in the stop member.

14. Roll tape measure according to claim 1, in which the friction bodies comprise material which, according to the Mohs' hardness scale, has a degree of hardness of 6.

15. Roll tape measure according to claim 11, in which the friction bodies comprise a material selected from the group consisting of glass, silicate, quartz, feldspar, sapphire, corundum and diamond.

16. Roll tape measure according to claim 15, in which the friction bodies comprise material which, according to the Mohs' hardness scale, has a degree of hardness of 6.

17. Roll tape measure according to claim 16, in which the friction bodies are applied only to a partial region of the abutting side.

18. Roll tape measure according to claim 17, in which the friction bodies are applied in a strip-shaped region of the abutting side.

* * * * *